United States Patent [19]

Hart et al.

[11] Patent Number: 5,443,914
[45] Date of Patent: Aug. 22, 1995

[54] CHEMICALLY INDUCED CRAZING RESISTANT ACRYLIC

[75] Inventors: Robert N. Hart, Tulsa; Christopher S. Simmons, Catoosa, both of Okla.

[73] Assignee: Nordam, Tulsa, Okla.

[21] Appl. No.: 169,160

[22] Filed: Dec. 17, 1993

[51] Int. Cl.$^6$ .............................................. B32B 9/04
[52] U.S. Cl. .................................. 428/447; 427/316; 427/322; 427/370; 427/387; 427/293.5; 427/430.1; 428/451
[58] Field of Search .................. 427/387, 393.5, 316, 427/322, 370, 430.1; 428/447, 451

[56] References Cited

U.S. PATENT DOCUMENTS

| | | | |
|---|---|---|---|
| 2,614,059 | 10/1952 | Cooper | 154/110 |
| 3,616,839 | 11/1971 | Burrin et al. | 156/99 X |
| 3,681,167 | 8/1972 | Moore | 156/311 |
| 4,303,738 | 12/1981 | Gini et al. | 428/423.1 |
| 4,308,317 | 12/1981 | Olson et al. | 428/412 |
| 4,477,528 | 10/1984 | Frye | 428/412 |
| 4,568,611 | 2/1986 | Amirsakis et al. | 428/425.9 |
| 4,725,501 | 2/1988 | Rukavina et al. | 428/412 |
| 4,942,065 | 7/1990 | Factor et al. | 427/387 |
| 5,039,566 | 8/1991 | Skubic et al. | 428/113 |

Primary Examiner—Michael Lusignan
Attorney, Agent, or Firm—Head & Johnson

[57] ABSTRACT

An enhanced acrylic for use in transparencies that provides an effective barrier to airborne environmental chemical agents that are known to craze standard stretched acrylics.

10 Claims, No Drawings

CHEMICALLY INDUCED CRAZING RESISTANT ACRYLIC

BACKGROUND OF THE INVENTION

Aircraft windows, particularly side mounted windows used in aircraft passenger cabins are today typically made of acrylics. Experience has shown that acrylics are best for such use due to their optical clarity and surface hardness together with superior weatherability and good chemical resistance. These characteristics have made acrylics the material of choice, not only for aircraft windows, but many other applications.

Current aircraft windows are manufactured from stretched acrylic. Stretched acrylic is made from a block of acrylic material which is heated and mechanically pulled in both the x and y coordinates e.g. stretched until a sheet of the proper thickness is achieved. Stretched acrylic has improved structural characteristics over cast acrylic. This stretched acrylic sheet is then used to cut out the appropriate size windows which are then further treated to shape them to the desired surface contour and their edges ground or beveled to allow for mounting to the window frame.

In aircraft operation the stretched acrylic window is exposed to the outside ambient conditions encountered by the aircraft in flight, while taxiing on the ground and while parked. These ambient conditions cover the variability in atmospheric conditions on the surface of the earth wherever aircraft may fly as well as the atmosphere up to the operational ceiling of the various aircraft which may be in excess of 36,000 feet (11.2 km).

At the same time the stretched acrylic must provide the optical characteristics desired by passengers, and maintain this clarity or transparency for a long period of time. Acrylics typically provide optical transparency equivalent to glass.

While new stretched acrylic windows have a smooth surface and are completely clear, over time, following installation in aircraft, the windows develop minute lines referred to as crazing. As the number and length of these lines increase over time, the optical transparency of the window diminishes.

Recently the aircraft industry has reported a new or different form of crazing. Windows have developed miniature star shaped imperfections referred to as star crazing. These imperfections consists of irregular spaced lines of about 1.5-15 mm in length radiating from a point within a circle of about 25 mm diameter. Although those skilled in the art have established that longitudinal crazing is primarily due to flexural stresses, the exact causes of the star crazing is yet under investigation. The current consensus is that star crazing is believed to be due to increased presence of toxic or reactive chemicals in the upper atmosphere, due both to the recent rash of large volcanic eruptions and to continuing increases in man-made pollutants. These chemicals have dispersed throughout the globe, but particularly in the northern temperate zone, where not coincidentally most of the commercial aircraft operate. The chemicals react with moisture which has penetrated microscopic holes in the acrylic resulting in the irregular shaped star crazing.

The major design criteria for aircraft window design thus are, optical transparency, structural integrity, aerodynamic shape and light weight. Economics demands that the cost of the product should be as low as possible and the service life should be as long as possible. The design must balance all of these sometime conflicting requirements.

Windows made of stretched acrylic lose their optical transparency over time due to the build up of crazing as described above. Crazing is caused by moisture penetrating microscopic pinholes and/or cracks that develop due either to pressure stresses to the aircraft and due to impact at high velocity by microparticles in the atmosphere including rain and other forms of precipitation. Any impact that opens up a moisture path through a microcrack is potentially damaging.

The longitudinal crazing due to flexural stresses of the window has fortunately been a fairly slow degradation of the optical transparency of stretched acrylic windows. The star crazing observed in the past few years has unfortunately caused a much more rapid degradation. There has therefore been a need to provide a means to solve the inherent deficiency in the prior art to resist the degradation from crazing of stretched acrylic windows.

Coatings to improve the abrasion resistance of acrylics have been described, but these methods cause unacceptable weight penalties e.g. glass coating or if plastic the coatings themselves tend to crack due to the ambient flexural stresses encountered in aircraft use. U.S. Pat. Nos. 4,308,317 and 4,477,528 describe such compositions.

The current invention overcomes the prior art short comings particularly with respect to the problem of star crazing.

SUMMARY OF THE INVENTION

It is an object of the present invention to provide aircraft windows made of stretched acrylic which are resistant to crazing.

Another object of the present invention is to provide an enhanced or treated stretched acrylic having significantly improved moisture and crazing resistance.

Another object of the present invention is to describe a method to enhance the stretched acrylic to achieve the significantly improved moisture and crazing resistance.

To manufacture an aircraft window according to the principles of this invention it is necessary to treat either the finished window or the stretched acrylic sheet prior to the manufacture of the window.

The stretched acrylic must have any moisture present evacuated. An oven, desiccant chamber or a vacuum chamber must be available for this procedure. The drying equipment must be capable of a combination of elevated temperatures and reduced pressure sustainable for extended periods. The temperature and pressure parameters may be varied to optimize the time in which the drying is achieved and thus reduce the cost of the process. The exact temperature, vacuum, relative humidity and time may be varied, a preferred embodiment of the process of the invention is described in following paragraphs.

Subsequent to the removal of the moisture from the stretched acrylic sheet or windows, the sheet or windows are then transferred to a tank containing a silicone fluid such as polydimethyl siloxane. The method used is pressure impregnation by which a very thin layer of the siloxane adheres to the acrylic. Due to the characteristics of the materials used i.e. siloxanes and acrylics some chemical adhesion may result. An autoclave or similar chamber capable of exerting elevated pressure and temperature is necessary for this procedure.

The procedure is to place the acrylic in the polydimethyl siloxane. The pressure is preferably raised but may be at one atmosphere and the temperature is raised. The equipment should be capable of maintaining this ambient for an extended period. The elevated pressure and temperature not only assure that the impregnation takes place in such a manner as to form an enhanced resistant acrylic, but also to do so in an expeditious time frame reducing the cost of the process. The exact limits of pressure, temperature and time may be varied and a preferred embodiment is described in the following paragraphs.

The optical and structural characteristics of the acrylic transparency are not affected by the treatment, while its susceptibility to crazing and particularly the more recently encountered star crazing is reduced.

Following the pressure impregnation the acrylic sheet or windows are rinsed and are ready to be prepared for shipment and subsequent installation.

DETAILED DISCLOSURE OF THE INVENTION

The treatment of the stretched acrylic in accordance with the present invention should be as follows:

The process starts with commercially available stretched acrylic conforming to MIL-P-25690. The acrylic may be in sheet form of typically 1 cm thickness or it may be in the shape of windows or other products where the enhanced properties of this invention would be advantageous.

The standard stretched acrylic absorbs moisture in ambient conditions and has a certain moisture content as prepared. The absorption of moisture reaches as much as 3% by weight of water in the low water grades of the untreated acrylic. In order to implement this invention the water molecules must be removed from the stretched acrylic. To achieve this dehydration the raw stretched acrylic is placed in a vacuum chamber where the ambient pressure may be reduced and the ambient temperature may be increased.

The reduced pressure and elevated temperature may be varied to achieve the drying process, depending on the capacity of the equipment used and the cost constraints upon the process. An elevated temperature range of 40° C. to 82° C. and a reduced pressure of 512 to 717 mm of mercury achieves the desired result when the stretched acrylic is exposed to said conditions for a period of 24 to 28 hours. Optimum performance is achieved when the drying process reduces the water content to less than one-half of one percent by weight.

The now dried stretched acrylic raw material is removed from the vacuum chamber and placed in a bath of polydimethyl siloxane fluid which is in an autoclave or similar pressure chamber. The raw material should preferably be totally submerged in the siloxane fluid however if only one surface is to be treated it would be sufficient to submerge only that surface.

The properties of siloxane are important to the enhancement of stretched acrylic as described in this invention and the preferred embodiment uses polydimethyl siloxane.

The process for treating the acrylic with the polydimethyl siloxane solutions is intended to pressure impregnate or bond the siloxane unto the acrylic. Adhesion will take place by heating the polydimethyl siloxane solution to an elevated temperature of between 70° C. and 110° C. and at a pressure from sea level ambient up to 10 atmospheres. The best results are achieved by exposing the acrylic raw material in the bath at elevated temperatures and pressure for 12 to 16 hours.

The exact mix of temperature, pressure and duration may be varied depending on the capability of the equipment and production cost constraints. The invention describes a method whereby the polydimethyl siloxane adheres to the surface as a result of the process.

The treated acrylic sheet, windows or other forms are then removed from the bath and rinsed with alcohol and water to remove excess solution.

The material treated by this process does not exhibit a weight penalty while retaining the structural characteristic of MIL-P-25690 acrylics.

While a preferred embodiment of the invention has been described, it is to be understood that the present invention is not limited to this precise disclosure, and that the invention is defined by the scope of the applicable claims.

What is claimed:

1. A process for treating stretched acrylic which comprises the steps of:
    (1) drying said stretched acrylic to reduce the water content of the stretched acrylic to less than about one-half of one percent by weight; and
    (2) immersing said stretched acrylic after step (1) in a siloxane fluid bath at an elevated pressure and temperature to impregnate said stretched acrylic with siloxane.

2. Stretched acrylic having the surface treated in accordance with the process of claim 1.

3. A process for treating stretched acrylic as in claim 1 wherein the dried stretched acrylic is immersed in a polydimethyl siloxane fluid bath at elevated temperature.

4. Stretched acrylic having the surface treated in accordance with the process of claim 3.

5. A process for treating stretched acrylic as in claim I where the dried stretched acrylic is immersed in a polydimethyl siloxane fluid bath at elevated pressure.

6. Stretched acrylic having the surface treated in accordance with the process of claim 5.

7. A process for treating stretched acrylic as in claim I where the dried stretched acrylic is immersed in a polydimethyl siloxane fluid bath at elevated temperature and pressure.

8. Stretched acrylic having the surface treated in accordance with the process of claim 7.

9. A process for treating stretched acrylic which comprises the steps of:
    drying said stretched acrylic at a temperature of 40° C. to 82° C. and at a pressure of 512–717 mm of mercury for 24 to 28 hours;
    immersing said stretched acrylic in a polydimethyl siloxane fluid bath at a temperature of 70° C. to 110° C. and a pressure from 1 to 10 atmospheres for 12 to 16 hours.

10. Stretched acrylic having the surface treated in accordance with the process of claim 9.

* * * * *